F. P. MIES & J. J. McGERRY.
ELECTRIC HEATER.
APPLICATION FILED JAN. 25, 1910.
997,465.
Patented July 11, 1911.
2 SHEETS—SHEET 1.
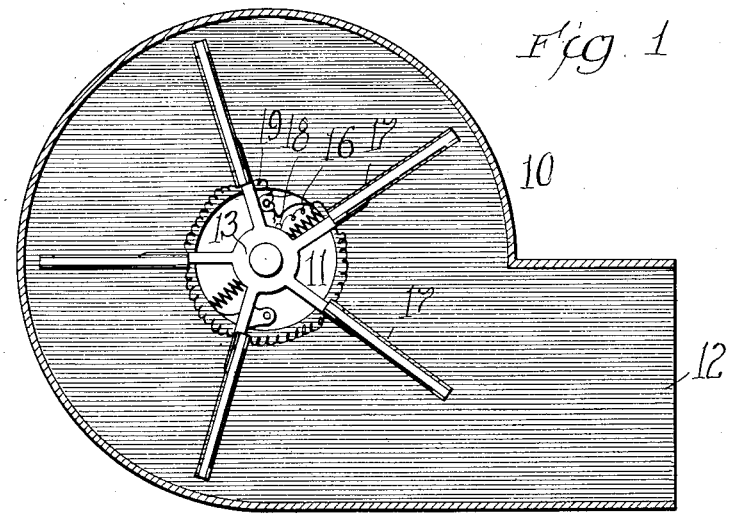
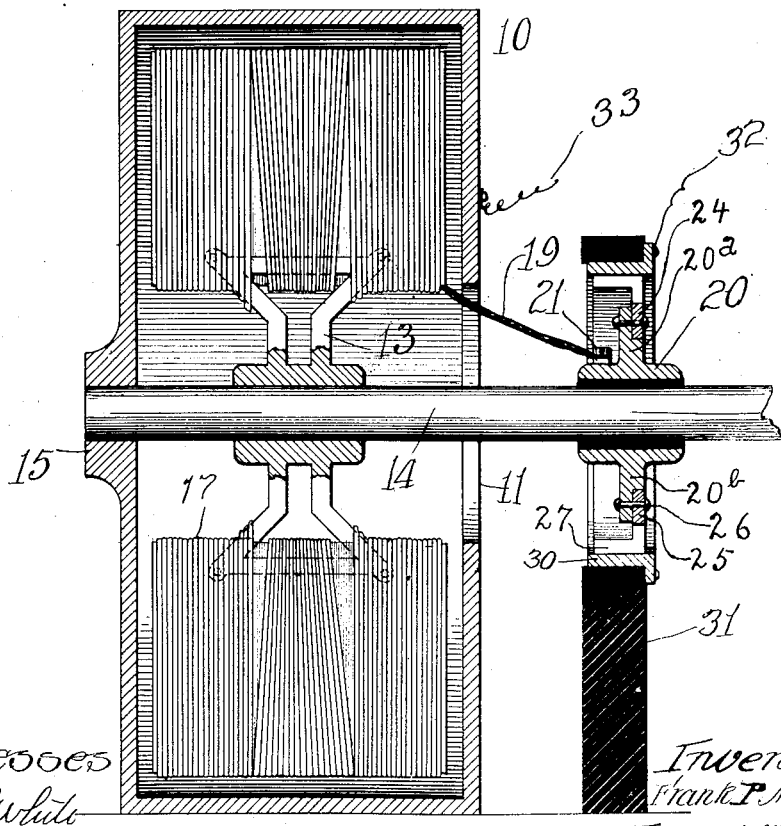

F. P. MIES & J. J. McGERRY.
ELECTRIC HEATER.
APPLICATION FILED JAN. 25, 1910.
997,465.
Patented July 11, 1911.
2 SHEETS—SHEET 2.
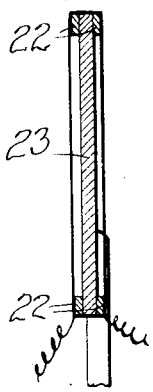
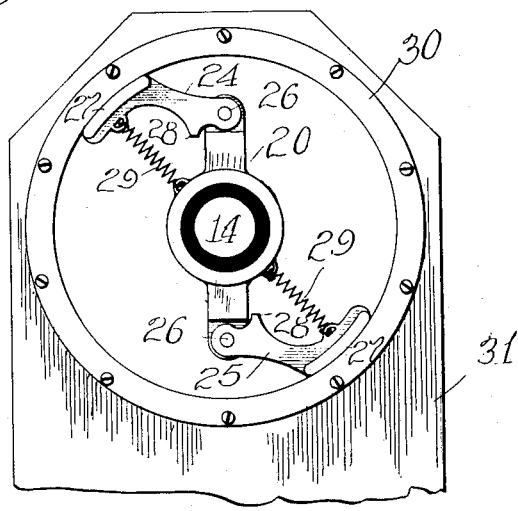
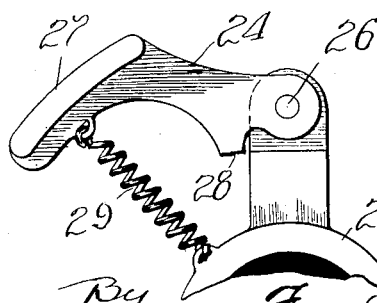
Witnesses:
H. C. Lewhite
R. A. White
Inventors
Frank P. Mies,
James J. McGerry,
By Force Bain May, Attys

UNITED STATES PATENT OFFICE.

FRANK P. MIES, OF CHICAGO, AND JAMES J. McGERRY, OF EDGEWATER, ILLINOIS.

ELECTRIC HEATER.

997,465.

Specification of Letters Patent.   Patented July 11, 1911.

Application filed January 25, 1910. Serial No. 539,957.

*To all whom it may concern:*

Be it known that we, FRANK P. MIES and JAMES J. McGERRY, citizens of the United States, respectively residing at Chicago, in the county of Cook and State of Illinois, and at Edgewater, in the county of Cook and State of Illinois, have invented certain new and useful Improvements in Electric Heaters, of which the following is a specification.

Our invention relates to improvements in electric heaters, and has for one of its objects to provide a heater that is highly efficient, compact in form, and simple and cheap of construction.

Other and further objects of our invention will become apparent to persons skilled in the art to which it appertains from the following description, taken in conjunction with the accompanying drawings, wherein—

Figure 1 is a longitudinal vertical section showing a fan with our invention applied thereto; Fig. 2 is a central transverse section of same; Fig. 3 is a detail showing one of the fan blades wound with an electric heater element, such as a wire, ribbon or the like; Fig. 4 is a centrifugal electric circuit controller; and Fig. 5 is an enlarged detail of same.

In all of the views like reference numerals apply always to corresponding parts.

A fan casing, generally indicated by 10, is provided with an air intake, 11, and an air outlet, 12, as usual in such structures. In the exemplification shown a five arm fan, 13, is mounted on a shaft, 14, and is provided with proper bearings, one of which, 15, only is shown. So far as described, the structure does not differ from the well known blower fan of this general type.

The object sought is to heat the air while confined within the casing of the fan and while in motion. To this end, a suitable and preferably a continuous electric conductor is wound about the fan blades and suitably secured thereto. One end, 16, of the electric heating element, or wire, 17, is connected to the fan frame as at 18, and the other end 19 is connected to a two armed insulated hub, 20, as at 21.

In order that the air may be brought into contact with the maximum surface of the heating element, insulating strips, 22, are secured to the flat sides of the fan blades, 23, and secured thereto and the wire may be wound around the fan blades and over said strips, whereby the wire will be raised above the surfaces of said blades, leaving an air space between said wires and blades for the free circulation of air, as clearly shown in Fig. 3.

It is well known that the current density in an electric conductor can be greatly increased over its normal carrying capacity, if the heat engendered thereby is quickly removed therefrom, as for instance by forcibly passing a current of air around and in contact with said conductor. In our improved heater, the current density in the wire is preferably such that when the fan proper is not in motion, the wire would be greatly overburdened and would be destroyed by the excessive heat within a few minutes. The high current density in the wire, however, is permissible and advantageously efficient when the fan is in motion and the air is moving rapidly in and around the heated surfaces of the wire, so that the heat is carried away by the air as fast as it is produced.

To provide against the danger of closing the electric circuit through the thermic element, we have designed an electric switch arranged to be automatically closed by the centrifugal effect produced by the rotating fan shaft. 20 is a hub provided with two integral arms, 20ª and 20ᵇ, carrying on their extremities two pivoted freely moving arms, 24 and 25, pivoted to the arms of the hub, as at 26. Each of the arms, 24 and 25, is provided with contact shoes, 27, and heel pieces, 28. A spring 29 connected between the hub and each of the moving arms, normally holds said arms in position with the heel pieces or stops, 28, in contact with the respective stationary arms, as shown in Fig. 4. A metal ring, 30, such as brass or the like, is mounted concentrically with the shaft, 14, on an insulating base or support, 31. An electric terminal, 32, is connected to the ring, 30, and another electric terminal, 33, is connected to the frame of the fan.

The use and operation of the device is as follows: The fan is set and maintained in motion by any convenient means, such as an electric motor, by belt, or otherwise. The tension of the springs, 29, is adjusted so that about the time when the fan has reached its predetermined speed, centrifugal effect will be sufficient to overcome the tension of the springs, and the arms, 24 and 25, will be thrown outwardly until their shoes, 27, are brought into contact with the conducting ring, 30, and the electric circuit thereby automatically closed. In stopping the fan, when the speed thereof has been decreased until the springs, 29, overcome the centrifugal effect, the arms, 24 and 25, will be drawn inwardly by said springs and the circuit will be automatically opened before the fan has been brought to a standstill. One arm would answer the purpose for closing and opening the circuit; two are shown in the drawings. The terminals, 32, 33, are to be connected to a suitable source of current supply.

While we have herein described in some detail a single embodiment of our invention, it will be apparent to those skilled in the art that numerous changes in the construction and arrangement might be made without departure from the spirit of the invention and within the scope of the appended claims.

What we claim is:

1. In a device of the character described, an electric conductor adapted and arranged to be heated by an electric current, an electric circuit of which said conductor is a part, movable means for agitating the air adjacent said conductor, and automatically operable means for closing said circuit set in motion by said agitating means when the latter has reached a predetermined speed.

2. In a device of the character described, a fan casing having intake and discharge openings, a fan having air-moving blades within said casing, an electric conductor wound about said blades and adapted to heat the air within said casing, a centrifugally operated switch for closing the electric circuit containing said heating conductor when said fan reaches a predetermined speed, and means associated with said fan for giving motion to said switch-operating means.

3. In a device of the character described, a fan casing having intake and discharge openings, a fan therein provided with a plurality of air moving blades, an electric heating conductor carried by said fan blade structure, and a centrifugally operated electric switch controlling said conductor, said switch comprising a radially moving arm pivotally supported on said fan shaft, and an insulated conducting ring surrounding said shaft, and within the plane of said arm.

In testimony whereof we hereunto set our hands.

FRANK P. MIES.
JAMES J. McGERRY.

In the presence of—
FORÉE BAIN,
W. LINN ALLEN.